(12) United States Patent
Nakai et al.

(10) Patent No.: US 9,213,179 B2
(45) Date of Patent: Dec. 15, 2015

(54) DISPLAY DEVICE

(75) Inventors: Yutaka Nakai, Kanagawa-ken (JP);
Tsuyoshi Hioki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 13/606,044

(22) Filed: Sep. 7, 2012

(65) Prior Publication Data

US 2012/0327069 A1 Dec. 27, 2012

Related U.S. Application Data

(63) Continuation of application No. PCT/JP2010/002458, filed on Apr. 2, 2010.

(51) Int. Cl.
*G09G 3/34* (2006.01)
*G02B 26/00* (2006.01)

(52) U.S. Cl.
CPC ............ *G02B 26/004* (2013.01); *G09G 3/3473* (2013.01); *G09G 2230/00* (2013.01); *G09G 2300/0426* (2013.01)

(58) Field of Classification Search
CPC ...... G02B 26/004; G02B 1/048; G02B 6/032; G02B 26/02; G09G 2300/0426; G09G 3/3473; G09G 2230/00
USPC ........ 345/84–87; 385/4, 25, 31, 40, 130, 123, 385/125, 141, 144
See application file for complete search history.

(56) References Cited

U.S. PATENT DOCUMENTS

| | | | |
|---|---|---|---|
| 5,067,793 A * | 11/1991 | Bachmann et al. | 385/127 |
| 5,528,399 A * | 6/1996 | Izumi et al. | 349/116 |
| 5,953,469 A | 9/1999 | Zhou | |
| 6,139,176 A * | 10/2000 | Hulse et al. | 362/581 |
| 6,377,383 B1 | 4/2002 | Whitehead et al. | |
| 6,525,483 B1 | 2/2003 | Van Gorkom et al. | |
| 2002/0090159 A1 | 7/2002 | Miyamaru et al. | |

(Continued)

FOREIGN PATENT DOCUMENTS

| | | |
|---|---|---|
| CN | 1602510 A | 3/2005 |
| CN | 1656408 A | 8/2005 |

(Continued)

OTHER PUBLICATIONS

Office Action issued Nov. 5, 2013 in Japanese Patent Application No. 2012-509168 with English language translation.

(Continued)

*Primary Examiner* — Alexander Eisen
*Assistant Examiner* — Abhishek Sarma
(74) *Attorney, Agent, or Firm* — Oblon, McClelland, Maier & Neustadt, L.L.P.

(57) ABSTRACT

According to one embodiment, a display device includes a light source, a light guide, a light extraction unit, and a drive circuit. The light source emits a first light. The light guide has a first end, a second end arranged in a first direction, and a side surface extending in the first direction. The light guide guides the first light from the first end toward the second end. The light extraction unit opposes the side surface, and includes first and second conductive units provided parallel to the side surface. The light extraction unit extracts the first light guided inside the light guide by coming close to the side surface for a state in which a voltage is applied to the first and second conductive units. The drive circuit applies the voltage between the first and second conductive units.

20 Claims, 7 Drawing Sheets

(56) References Cited

U.S. PATENT DOCUMENTS

| | | | |
|---|---|---|---|
| 2003/0044149 A1* | 3/2003 | Fraval et al. | 385/125 |
| 2005/0117109 A1 | 6/2005 | Marra et al. | |
| 2005/0123243 A1* | 6/2005 | Steckl et al. | 385/40 |
| 2005/0174507 A1 | 8/2005 | De Zwart et al. | |
| 2006/0291774 A1 | 12/2006 | Schoellmann et al. | |
| 2007/0189667 A1* | 8/2007 | Wakita et al. | 385/31 |
| 2008/0030650 A1* | 2/2008 | Kitagawa et al. | 349/65 |
| 2008/0198292 A1 | 8/2008 | Marra et al. | |
| 2009/0245741 A1* | 10/2009 | Hioki et al. | 385/123 |

FOREIGN PATENT DOCUMENTS

| | | |
|---|---|---|
| CN | 1768364 A | 5/2006 |
| JP | 02-254405 | 10/1990 |
| JP | 11-258558 | 9/1999 |
| JP | 2001-515224 | 9/2001 |
| JP | 2002-148533 | 5/2002 |
| JP | 2002-533764 | 10/2002 |
| JP | 2005-227324 | 8/2005 |
| JP | 2008-542992 | 11/2008 |
| JP | 2008-310126 | 12/2008 |
| JP | 2009-237276 | 10/2009 |
| WO | WO 2006/126129 A2 | 11/2006 |
| WO | WO 2008/152927 A1 | 12/2008 |

OTHER PUBLICATIONS

Notification of Reason(s) for Refusal issued Jan. 31, 2013 in Japanese Patent Application No. 2012-509168 (with English translation).
International Search Report issued on Jul. 20, 2010 for PCT/JP2010/002458 filed on Apr. 2, 2010 (with English translation).
International Written Opinion issued on Jul. 20, 2010 for PCT/JP2010/002458 filed on Apr. 2, 2010.
Chinese Office Action issued Apr. 30, 2014, in China Patent Application No. 201080065982.2 (with English translation).

* cited by examiner

DISPLAY DEVICE

CROSS-REFERENCE TO RELATED APPLICATIONS

This is a continuation application of International Application PCT/JP2010/002458, filed on Apr. 2, 2010; the entire contents of which are incorporated herein by reference.

FIELD

Embodiments described herein relate generally to a display device.

BACKGROUND

In recent years, the demand has increasingly grown for display devices including liquid crystal displays and plasma displays due to the start of digital terrestrial broadcasting and the spread of the internet and mobile telephones. Although some of these displays are mounted in mobile devices as compact displays, on the other hand, the demand for large-screen televisions also is growing.

In a conventional display, matrix interconnects are provided on a glass substrate; and particularly in the case of a liquid crystal display, thin film transistors are provided at the intersections of the matrix interconnects. Semiconductor manufacturing processes are used for the thin film processing. Therefore, when attempting to enlarge the display, it is necessary to use massive apparatuses based on semiconductor manufacturing processes; and the production line investments are enormous. Moreover, when the display is enlarged, the interconnect resistance increases because the interconnects lengthen; and problems occur because the transmission of the signals via the interconnects is delayed.

As a method for solving such problems, a display using a light guide structure has been proposed. This is a method to display an image by extracting light from any position of the light guide side surface by mechanically controlling the contact or the non-contact of a light extraction unit at the side surface of the light guide; and a display device having an efficiency higher than that of a liquid crystal display or a plasma display can be realized.

For example, in U.S. Pat. No. 5,953,469, an electrostatic force is used to cause a structural body for extracting the light to contact the light guide. An electrode is provided in the light guide; an electrode is provided also in the structural body opposing the light guide; and the structural body is caused to contact the light guide by causing an electrostatic force to occur due to the voltage difference between the two opposing electrodes (the electrode of the light guide and the electrode of the structural body). In the case where the voltage is not applied between the electrodes, it is necessary for the light guide and the structural body to be provided within a range in which the electrostatic force acts between the electrodes, that is, at an extremely small distance. Accordingly, it is desirable for the structural body to be disposed with high precision.

However, it is difficult to dispose many structural bodies uniformly with high precision.

Moreover, although it is necessary for the electrode provided in the light guide to be transparent for easy extraction of the light, the light is absorbed, albeit slightly, by transparent electrodes typified by ITO (indium tin oxide alloy) which is generally used. Therefore, the light extraction efficiency decreases because a part of the light inside the light guide is absorbed by the transparent electrode.

DETAILED DESCRIPTION

According to one embodiment, a display device includes a light source, a light guide, a light extraction unit, and a drive circuit. The light source is configured to emit a first light. The light guide has a first end, a second end arranged in a first direction with the first end, and a side surface extending in the first direction. The light guide is configured to guide the first light from the first end toward the second end. The light extraction unit opposes the side surface. The light extraction unit includes a first conductive unit provided parallel to the side surface and a second conductive unit provided parallel to the side surface. The light extraction unit is configured to extract the first light guided inside the light guide by coming close to the side surface for a state in which a voltage is applied to the first conductive unit and the second conductive unit than for a state in which the voltage is not applied. The drive circuit is configured to apply the voltage between the first conductive unit and the second conductive unit.

According to the embodiment, the precision of the distance between the light guide and the light extraction unit of the display device can be increased; and the light extraction efficiency can be increased.

The embodiment relates to a display device that uses a light guide structure. The embodiment provides a display device having high light extraction efficiency and high precision of the distance between the light guide and the light extraction unit.

Various embodiments will be described hereinafter with reference to the accompanying drawings.

First Embodiment

Figure 1:
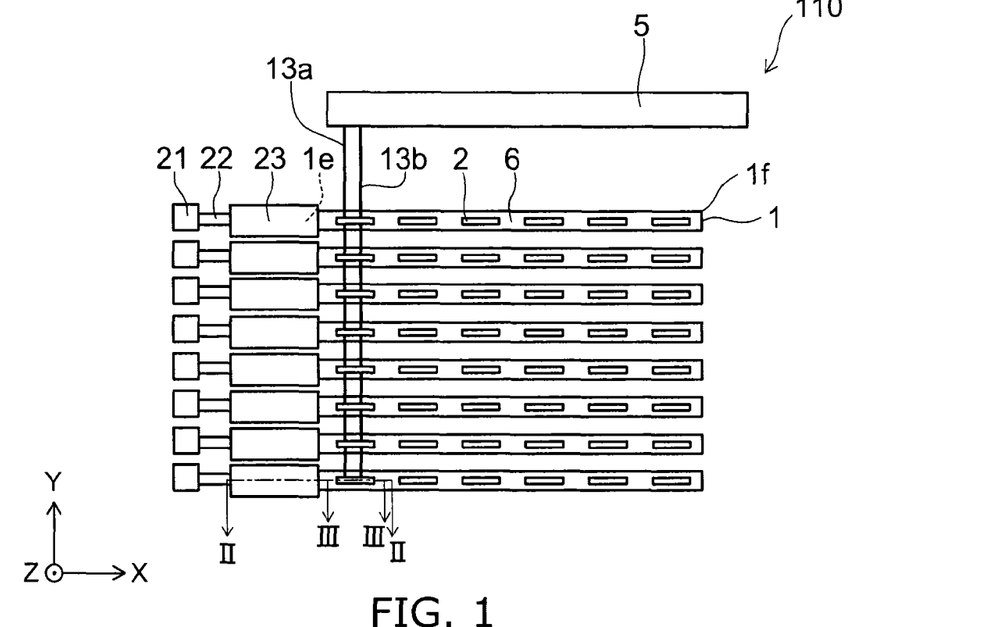
FIG. 1 is a whole top view of a display device according to a first embodiment.
Figure 2:
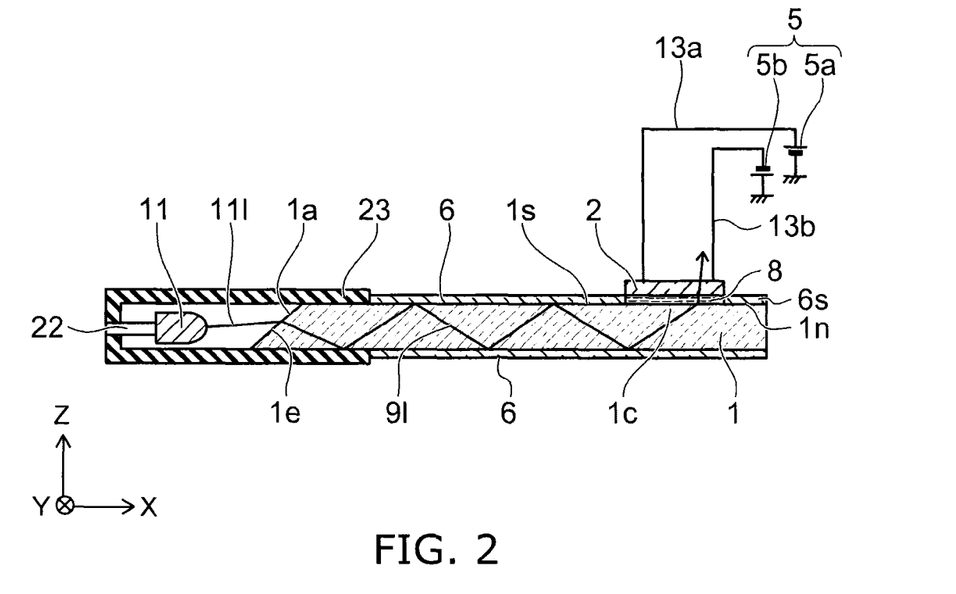
FIG. 2 is a partial cross-sectional view of the display device according to the first embodiment.

A display device which is a first embodiment that can display any image by extracting light at any position using light guides will now be described using FIG. 1 and FIG. 2. FIG. 1 is a plan view of the display device. FIG. 2 is the line II-II cross-sectional view of FIG. 1.

The display device 110 includes multiple units disposed in parallel. The multiple light extraction units 2 are provided in each of the units; and each of the light extraction units 2 is connected to a drive circuit 5 via scanning lines 13a and 13b. (Although not shown in FIG. 1, all of the light extraction units 2 of each of the units are connected to the drive circuit 5 by the scanning lines 13a and 13b.)

As shown in FIG. 2, each of the units includes a light source 11, a tube 23 covering the light source 11, and a light guide 1 having a columnar configuration linked to the tube 23. The light source 11 emits light by a power supply being supplied via a connecting member 22 from a power supply 21 outside the tube 23. The light source 11 is, for example, a light emitting diode (LED). The tube 23 causes a light 11*l* (first light) of the light source 11 to enter the light guide 1 by efficiently reflecting the light by inner walls.

The configuration of the light guide 1 is a columnar configuration extending in one direction (first direction) and has an incident surface 1a at one end 1e (the first end) thereof. The light guide 1 is disposed such that the light 11*l* of the light source 11 enters from the incident surface 1a. The light entering from the incident surface 1a propagates toward one other end 1f (the second end) of the light guide 1 while repeating total internal reflections in the light guide 1 interior. The light 11*l* enters the light guide 1 from the incident surface 1a to be a light 9*l* (second light) in the light guide 1 interior. The light 9*l* is guided toward the one other end 1f of the light guide 1 while repeating total reflections in the light guide 1 interior.

A side surface 1s of the light guide 1 (a range not covered with the tube 23) is covered with a cladding 6. The light extraction unit 2 is multiply provided at a prescribed spacing on the cladding 6. Because one pixel is formed of one light extraction unit 2, one display screen is formed by arranging the light extraction units 2 (pixel) two-dimensionally.

The cladding 6 has a solid portion and a liquid portion 8. Among them, the liquid portion 8 is provided in the portion opposing each of the light extraction units 2 corresponding to each of the pixels. By providing such a liquid portion 8, the distance between the light guide 1 and the light extraction unit 2 can be controlled with high precision. In the embodiment, a portion 6s of the cladding 6 other than the portion opposing the light extraction unit 2 is taken to be formed of a solid.

The display device 110 includes the light source 11, the light guide 1, the light extraction unit 2, and the drive circuit 5. The light source 11 emits the light 11*l*. The light source 11 and the light guide 1 are included in one unit.

The light guide 1 has the one end 1e, the one other end 1f, and the side surface 1s. The one other end 1f is arranged with the one end 1e in the first direction. The first direction is, for example, an X-axis direction. The side surface 1s is provided between the one end 1e and the one other end 1f. The side surface 1s extends in the first direction. The side surface 1s parallel to the first direction. The light guide 1 guides the light 11*l* from a side of the one end 1e toward a side of the one other end 1f.

In the display device 110, the light guide 1 is provided in a plurality. The plurality of light guides 1 are arranged in a second direction non-parallel to the first direction (X-axis direction). The second direction is, for example, perpendicular to the first direction. The second direction is taken as, for example, a Y-axis direction perpendicular to the X-axis direction. A direction perpendicular to the first direction and the second direction is taken as a third direction. The third direction is, for example, a Z-axis direction perpendicular to the X-axis direction and the Y-axis direction.

In the display device 110, the light extraction unit 2 is provided in a plurality. The plurality of light extraction units 2 are provided in a matrix configuration in a plane (for example, in X-Y plane) including the first direction and the second direction.

The cladding 6 includes the portion 6s not opposing the light extraction unit 2 and a portion opposing the light extraction unit. For example, the portion 6s not opposing the light extraction unit 2 of the cladding 6 is a solid portion. A portion opposing the light extraction unit 2 of the cladding 6 is a liquid portion 8.

The cladding 6 is provided on the side surface 1s of the light guide 1. The classing 6 has a refractive index lower than a refractive index of the light guide 1. A thickness of the portion (in this example, liquid portion 8) opposing the light extraction unit 2 of the cladding 6 is variable.

The side surface 1s of the light guide 1 has a portion 1c opposing the light extraction unit 2 and a portion 1n not opposing the light extraction unit 2. The portion 6s not opposing the light extraction unit 2 of the cladding 6 covers the portion 1n not opposing the light extraction unit 2 of the side surface 1s of the light guide 1.

Figure 3:
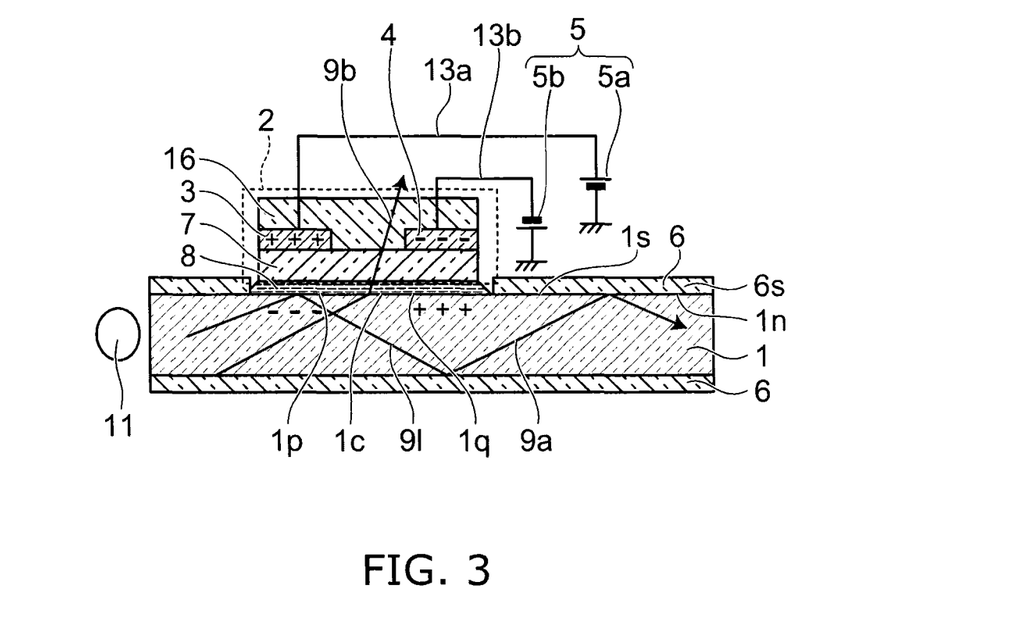
FIG. 3 is a partial cross-sectional view of the display device according to the first embodiment.

FIG. 3 shows the structure of one pixel of the display device according to the first embodiment. Namely, FIG. 3 is a drawing in which the portion of the display device where the light extraction unit 2 is provided is enlarged, and is a drawing illustrating the line III-III cross section of FIG. 1. An optical path 9a is an example of an optical path traveling while repeating total internal reflections at the side surface 1s of the light guide 1. An optical path 9b is an example of an optical path extracted to the light extraction unit 2 at the liquid portion 8 which is the side surface 1s of the light guide 1.

The side surface 1s of the light guide 1 has a first portion 1p and a second portion 1q. The second portion 1q is separated from the first portion 1p. The first portion 1p and the second portion 1q are parts of a portion 1c opposing the light extraction unit 2. That is, the first portion 1p and the second portion 1q oppose the light extraction unit 2.

The refractive index of the cladding 6 is lower than the refractive index of the light guide 1 both in the liquid portion 8 opposing the light extraction unit 2 and in the solid portion (the portion 6s not opposing the light extraction unit 2) other than the liquid portion 8. For example, a dimethyl silicone oil (refractive index of 1.40) can be used as the liquid portion 8. The thickness of the liquid portion 8 is 1 μm. The dimethyl silicone oil is easily applied to the device because the dimethyl silicone oil has low viscosity, is stable at room temperature, and has high electrical resistance.

In the embodiment, the portion (the portion 6s not opposing the light extraction unit 2) of the cladding 6 other than the liquid portion 8 includes, for example, poly fluoro acrylate (Poly fluoro acrylate (PFA), having a refractive index of 1.40). In the embodiment, PMMA (poly methyl methacrylate, having a refractive index of 1.49) is used as the light guide 1. The cladding 6 is insulative. The light guide 1 is insulative.

The light extraction unit 2 includes a first conductive unit 3, a second conductive unit 4, and a holding member 16 that holds the first conductive unit 3 and the second conductive unit 4.

The first conductive unit 3 opposes the first portion 1p of the side surface 1s of the light guide 1. The second conductive unit 4 opposes the second portion 1q of the side surface 1s of the light guide 1. In the specification, "opposing" includes a state of facing with other elements interposed as well other than a state of directly facing. The first conductive unit 3 opposes the first portion 1p via the liquid portion 8 and a contact surface 7.

The first conductive unit 3 and the second conductive unit 4 may be formed on a surface of the holding member 16 and may be formed to be buried in the holding member 16. In FIG. 3, the first conductive unit 3 and the second conductive unit 4 are formed to be buried in the holding member 16. The holding member 16 contacts the liquid portion 8 at the contact surface 7. The first conductive unit 3 and the second conductive unit 4 are formed in a plane parallel to the side surface 1s of the light guide 1.

The first conductive unit 3 and the second conductive unit 4 oppose the side surface 1s. The first conductive unit 3 and the second conductive unit 4 are disposed parallel to the side surface 1s.

The materials of the first conductive unit 3 and the second conductive unit 4 have high conductivity and high optical transmissivity. For example, indium tin oxide (ITO) is used for the first conductive unit 3 and the second conductive unit 4. The material of the holding member 16 has highly insulative properties and high optical transmissivity. For example, a silicon oxide film, a silicon nitride film, or the like is used for the holding member 16.

The drive circuit 5 is connected to the first conductive unit 3 by the first scanning line 13a, and connected to the second conductive unit 4 by the second scanning line 13b. For example, a first terminal 5a of the drive circuit 5 is connected to the first scanning line 13a. A second terminal 5b of the drive circuit 5 is connected to the second scanning line 13b. The drive circuit 5 can apply a voltage to each of the first conductive unit 3 and the second conductive unit 4. The voltage of the first terminal 5a is a first voltage. The voltage of the second terminal 5b is a second voltage.

Whether or not the light inside the light guide 1 is extracted from the light extraction unit 2 is determined by whether or not voltages are applied to the first conductive unit 3 and the second conductive unit 4. For example, when the voltages are not applied to the first conductive unit 3 and the second conductive unit 4, the light 9l traveling through the light guide 1 undergoes total internal reflections at the interface between the light guide 1 and the liquid portion 8; and optical loss does not occur. In other words, the light 9l inside the light guide 1 undergoes total internal reflections at the side surface portion where the liquid portion 8 is provided and is not extracted outside the light guide 1.

To extract the light 9l inside the light guide 1 to the outside, voltages of mutually opposite polarities are applied respectively to the first conductive unit 3 and the second conductive unit 4. For example, while the drive circuit 5 performs a first operation of applying the first voltage of a first polarity to the first conductive unit 3 and applying the second voltage of a second polarity different from the first polarity to the second conductive unit 4. In FIG. 3, a positive voltage is applied to the first conductive unit 3; and a negative voltage is applied to the second conductive unit 4.

When such voltages are applied to the first conductive unit 3 and the second conductive unit 4, charges of polarities that are opposite to those of the first conductive unit 3 and the second conductive unit 4 are induced at positions of the light guide 1 respectively opposing the first conductive unit 3 and the second conductive unit 4 (for example, the first portion 1p and the second portion 1q). In other words, a charge (−) of a polarity opposite to the polarity of the first conductive unit 3 is induced at the position (for example, the first portion 1p) of the light guide 1 that opposes the first conductive unit 3. Also, a charge (+) of a polarity opposite to the polarity of the second conductive unit 4 is induced at the position (for example, the second portion 1q) of the light guide 1 that opposes the second conductive unit 4. Accordingly, a mutually attractive electrostatic force occurs between the first conductive unit 3 and the position of the light guide 1 that opposes the first conductive unit 3. Also, a mutually attractive electrostatic force occurs between the second conductive unit 4 and the position of the light guide 1 that opposes the second conductive unit 4.

Thus, when the mutually attractive static electricity occurs between the light extraction unit 2 and the light guide 1, the light extraction unit 2 can become proximal to the light guide 1 with the liquid portion 8 interposed.

Generally, a phenomenon is known in which, in the case where light traveling through a material having a high refractive index undergoes total internal reflections at a boundary with a material having a low refractive index, a very small amount of the light penetrates a distance of approximately the wavelength of the light from the high refractive index side into the low refractive index side. This light is called evanescent light. Because the refractive index of the liquid portion 8 is less than that of the light guide 1, the light 9l penetrates into the liquid portion 8 side when the light 9l traveling through the light guide 1 undergoes total internal reflections at the portion where the liquid portion 8 is in contact with the liquid guide 1. At this time, the distance that the light 9l penetrates into the liquid portion 8 is approximately the wavelength of the light (light 11l).

Accordingly, when the light extraction unit 2 compresses the liquid portion 8 and the thickness of the liquid portion 8 becomes approximately the wavelength, the light that has penetrated propagates in the light extraction unit 2. When the light extraction unit 2 is caused to become proximal to the light guide 1 by the electrostatic force as described above, the thickness of the liquid portion 8 can be reduced because the light extraction unit 2 presses the opposing liquid portion 8 of the cladding 6. Thus, if the thickness of the liquid portion 8 decreases to within approximately the wavelength of the light, the evanescent light occurring at the side surface 1s of the light guide 1 propagates in the light extraction unit 2; and the light is extracted as in the optical path 9b. The thickness (the thickness of the portion opposing the light extraction unit of the cladding 6, that is, the thickness in the state in which the voltage is applied to the first conductive unit 3 and the second conductive unit 4) of the liquid portion 8 when compressed is not more than 0.3 μm and desirably not more than 0.1 μm.

Thus, for the light extraction unit 2 corresponding to each of the pixels, the proximity/remoteness to the light guide 1 can be controlled by the existence/absence of the voltage applied by the drive circuit 5. Thereby, the light can be extracted at any position of the two-dimensional matrix configuration; and the display device as an entirety can display any image.

Thus, the distance between the light extraction unit 2 and the side surface 1s is variable by the first voltage applied to the first conductive unit 3 and second voltage applied to the second conductive unit 4. In the light extraction unit 2, a first distance between the light extraction unit 2 and the side surface when the voltage is applied to the first conductive unit 3 and the second conductive unit 4 becomes shorter than a second distance between the light extraction unit 2 and the side surface when the voltage is not applied to the first conductive unit 3 and the second conductive unit 4. Thus, the light extraction unit 2 extracts the light 9l based on the light 11l guided inside the light guide 1.

It is desirable for the gap between the light guide 1 and the light extraction unit 2 in the state in which the voltage is not applied to the light extraction unit 2 to be approximately 1 μm (for example, not less than 0.5 μm and not more than 10 μm). When the distance between the light guide 1 and the light extraction unit 2 is long, the electrostatic force no longer acts easily; and a higher applied voltage becomes necessary. Further, even in the state in which the voltage is not applied to the light extraction unit 2, the light 9l of the light guide 1 leaks out when the distance between the light guide 1 and the light extraction unit 2 is too short.

In the embodiment, because the portion 1c of the light guide 1 opposing the light extraction unit 2 is covered with the liquid portion 8, the distance between the light guide 1 and the light extraction unit 2 is easy to control in the state in which the voltage is not applied to the light extraction unit 2. The distance between the light guide 1 and the light extraction unit 2 in the state in which the voltage is not applied to the light extraction unit 2 substantially is determined by the wettability between the liquid portion 8 and the light extraction unit 2. Accordingly, by determining combination of the material of the liquid portion 8 with the material of the holding member 16 of the light extraction unit 2 by considering the wettability, the light extraction unit 2 can be provided such that the distance from the light guide 1 is within the range in which the electrostatic force acts and is a distance at which the light does not leak from the light guide 1.

For example, in the case where the liquid portion 8 is the dimethyl silicone oil, the surface tension thereof is approximately 21 dyne/cm and wetting occurs well with respect to almost all solid surfaces. According to the material of the holding member 16 of the light extraction unit 2, there are cases where both distances are not more than 0.1 μm even in the state in which the voltage is not applied to the light extraction unit 2. In other words, there is a risk that the light from the light guide 1 may be undesirably extracted even though the voltage is not applied to the light extraction unit 2.

In such a case, hydrophobic processing is performed on the surface (the contact surface 7) of the holding member 16 of the light extraction unit 2. Being hydrophobic refers to a low wettability between the liquid portion 8 and the contact surface 7 of the light extraction unit 2. Here, the hydrophobic property for the contact surface 7 for which the hydrophobic processing has been performed with respect to the liquid portion 8 is higher than the hydrophobic property for the light guide 1 with respect to the liquid portion 8. The light extraction unit 2 has a first surface being in contact with the liquid (liquid portion 8). On the other hand, the light guide 1 has a second surface being in contact with the liquid. The wettability of at least a part of the first surface to the liquid is lower than the wettability of the second surface to the liquid. By the hydrophobic property of the contact surface 7 being higher than the hydrophobic property of the light guide 1, the wettability between the contact surface 7 and the liquid portion 8 can be slightly reduced; and as a result, it is possible to increase the thickness of the liquid portion 8. In other words, the distance between the light extraction unit 2 and the light guide 1 can be provided to be the distance within the range in which the electrostatic force acts and at which the light does not leak from the light guide 1 in the state in which the voltage is not applied.

Specifically, the thickness of the liquid portion 8 could be adjusted to be approximately 1 μm as a result of performing hydrophobic processing by coating Cytop (made by Asahi Glass) with a thickness of 0.1 μm on the contact surface 7. The hydrophobic processing may be performed on the side of the light guide 1 contacting the liquid portion 8 and may be performed on both the light guide 1 side and the light extraction unit 2 side. Further, the hydrophobic processing surface may be formed locally inside one pixel. In other words, it is also possible to adjust the distance between the light guide 1 and the light extraction unit 2 by performing the hydrophobic processing on the portion of the light guide contacting the liquid portion 8 or a portion of the contact surface 7 of the light extraction unit 2.

According to the example, it is possible to make the gap between the light guide 1 and the light extraction unit 2 with self-aligned processing by sufficiently utilizing the properties of the liquid portion 8 by pre-forming the water-repellent surface. Thereby, the uniformity between the pixels also increases drastically because the distance between the light guide 1 and each of the light extraction units 2 can be formed with good precision. In other words, the light amount extracted at each of the light extraction units 2 can be uniform.

In the state in which the thickness of the liquid portion 8 is approximately 1 μm, the light extraction unit 2 adheres to the liquid portion 8 due to the liquid surface tension. The light extraction unit 2 is, at its largest, approximately several millimeters to correspond to the pixel size. Thereby, if a lightweight member having a film as a base is used for the light extraction unit 2, the light extraction unit 2 adheres to the liquid portion 8 because the surface tension surpasses gravity.

Figure 4A:
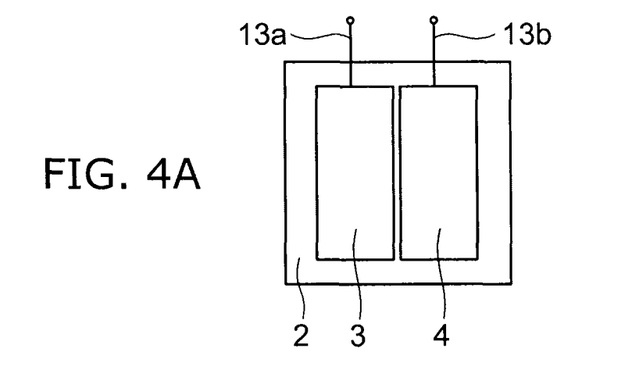
FIG. 4A is a plan view of a light extraction unit according to the first embodiment.
Figure 4B:
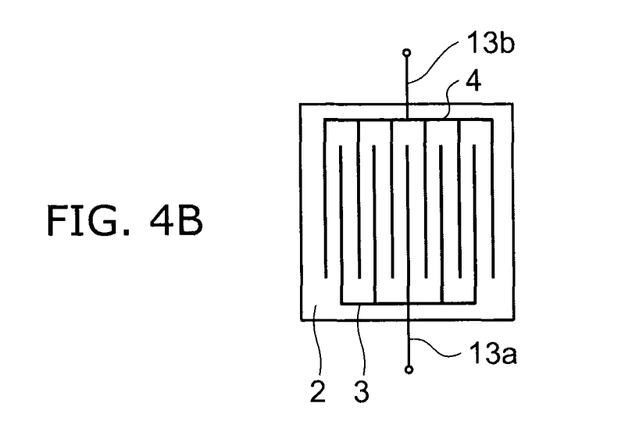
FIG. 4B is a plan view of a light extraction unit according to a variation of the first embodiment.
Figure 4C:
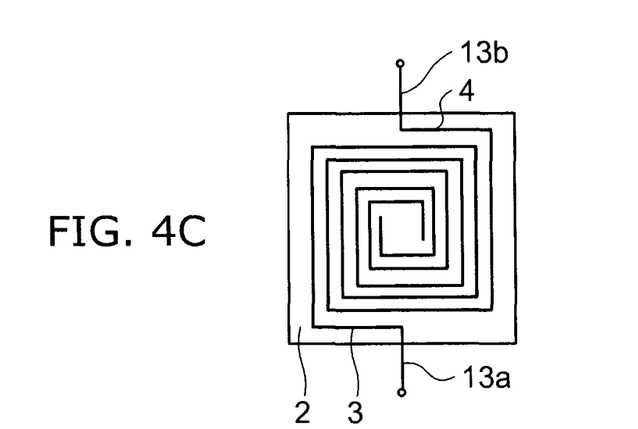
FIG. 4C is a plan view of a light extraction unit according to a variation of the first embodiment.

As shown in FIG. 4A, the configurations of the first conductive unit 3 and the second conductive unit 4 may be on substantially rectangular and a slight gap may be disposed between the first conductive unit 3 and the second conductive unit 4. The electrostatic force increases as the gap decreases. Also, as shown in FIG. 4B, the first conductive unit 3 and the second conductive unit 4 may be formed in interdigit configurations and a plurality of extending portions of the first conductive unit 3 and a plurality of extending portions of the second conductive unit 4 may be disposed alternately. The electrostatic force is increased by increasing the adjacent (opposing in the X-Y plane) lengths of the first conductive unit 3 and the second conductive unit 4. Moreover, the configuration of the first conductive unit 3 and the second conductive unit 4 may be spiral and the like shown in FIG. 4C.

A voltage of ±80 V was applied between the first conductive unit 3 and the second conductive unit 4. For example, +80 V is applied to the first conductive unit 3, and −80 V is applied to the second conductive unit 4. For example, −80 V may be applied to the first conductive unit 3, and +80 V may be applied to the second conductive unit 4. The light extraction from the light guide 1 could be confirmed as a result of the light extraction unit 2 becoming proximal to the light guide 1 due to the gap becoming narrow between the light guide 1 and the light extraction unit 2 that was held.

When the application of the voltage was stopped, a spacing between the light guide 1 and the light extraction unit 2 returned to the original spacing.

The light extracted from the light extraction unit 2 is emitted in a direction crossing the X-axis direction of the light guide 1. It is possible for the light extracted from the light extraction unit 2 to direct in a direction more perpendicular to the X-axis direction of the light guide 1 by providing a light scattering member or a light refracting member at the interior or at the upper surface of the light extraction unit 2; and a display device having excellent visual angle characteristics can be realized.

In the case where the voltage of the first conductive unit 3 and the second conductive unit 4 is removed, a relaxation time for the charge that is induced in the positions of the light guide 1 that oppose the electrodes (conductive units) to be neutralized is necessary until the distance between the light guide 1 and the light extraction unit 2 returns to the state prior to applying the voltage. In other words, even when the voltage is removed, the light extraction is performed until the relaxation time elapses. Therefore, the response rate of the light extraction is increased by quickening the neutralization of the charge by applying voltages to the first conductive unit 3 and the second conductive unit 4 that have polarities opposite to the voltages that were being applied for a short period of time prior to removing the voltages that were being applied. Also, the charging of the light guide 1 can be suppressed and a stable operation can be realized by changing the polarities of the voltages applied to the first conductive unit 3 and the second conductive unit 4 every extraction operation when performing the light extraction.

The number of the light guides 1 and the number of the light extraction units 2 of the display device 110 are not limited to those of FIG. 1.

Second Embodiment

Figure 5:
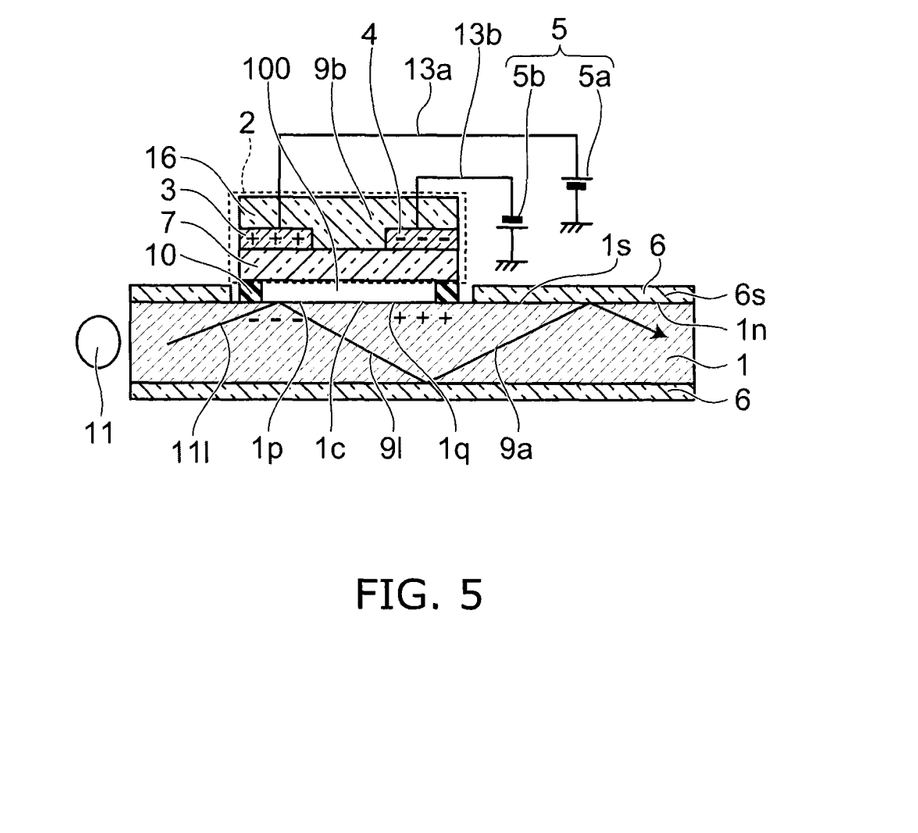
FIG. 5 is a cross-sectional view of a display device according to a second embodiment.

FIG. 5 shows the structure of one pixel of a display device according to a second embodiment. The second embodiment differs from the first embodiment in that a spacer unit 10 is provided inside a space 100 between the light extraction unit 2 and the side surface 1s of the light guide 1. In a second example, the space 100 is made in the inner region interposed between two spacers 10 between the light extraction unit 2 and the side surface 1s of the light guide 1. For example, the space 100 is made every constant spacing of the cladding 6 of the light guide 1 by removing a part of the cladding 6.

In the case where the voltages are not applied to the first conductive unit 3 and the second conductive unit 4, the distance between the light guide 1 and the light extraction unit 2 is maintained at the designed distance by the spacer unit 10.

The light (light 11l) from the light source 11 enters from the one end 1e of the light guide 1 and the light 9l in the light guide 1 travels through the light guide 1 while repeating total internal reflections at the side surface 1s of the light guide 1 as does the optical path 9a. Although the cladding 6 is provided at the side surface 1s of the light guide 1. This is different from the first embodiment in that the cladding 6 is not provided at the location corresponding to the pixel (corresponding to the liquid portion 8).

In the light extraction unit 2, the first conductive unit 3 and the second conductive unit 4 are formed in a plane parallel to the side surface 1s of the light guide 1. The first conductive unit 3 and the second conductive unit 4 may be formed on the surface of the holding member 16 and may be formed to be buried in the holding member 16. In FIG. 5, the first conductive unit 3 and the second conductive unit 4 are formed to be buried in the holding member 16. The drive circuit 5 applies voltages of mutually opposite polarities (first voltage and second voltage) to the first conductive unit 3 and the second conductive unit 4.

The gap between the light extraction unit 2 and the side surface 1s of the light guide 1 is maintained by the spacer unit 10 having a protruding configuration formed with a height of 1 μm between the light guide 1 and the contact surface 7 of the light extraction unit 2. In other words, in the second embodiment, two spacer units 10 are provided between the light guide 1 and the light extraction unit 2; and the space 100 is made on the inner side enclosed with the light guide 1, the light extraction unit 2, and the two spacer units 10.

A material having highly insulative properties is used as the material of the spacer units 10. If the material is optically transmissive, it is favorable for the refractive index to be the same as or less than that of the cladding 6 such that the light does not leak out from the contact portion with the light guide 1 toward the spacer unit 10; and a fluoric resin is appropriate as the material of the spacer unit 10. If the material is a material that does not transmit light, a colored resin, a metal, etc., are appropriate as the material of the spacer unit 10.

Also, a material that has highly insulative properties, has high optical transmissivity, and easily undergoes elastic deformation is used as the holding member 16 of the light extraction unit 2. For example, an acrylic resin, a silicon resin, etc., are used as the holding member 16.

When the voltages are applied to the first conductive unit 3 and the second conductive unit 4, charges of polarities opposite to those of the first conductive unit 3 and the second conductive unit 4 are induced respectively at the positions of the light guide 1 that oppose the first conductive unit 3 and the second conductive unit 4; as a result, an electrostatic force occurs between the light guide 1 and the conductive unit 3 and between the light guide 1 and the second conductive unit 4; and the light guide 1 and the first conductive unit 3, and the light guide 1 and the second conductive unit 4 are pulled together. In other words, the electrostatic force occurs between the first conductive unit 3 and the portion of the light guide 1 opposing the first conductive unit 3; the electrostatic force occurs between the second conductive unit 4 and the portion of the light guide 1 opposing the second conductive unit 4; and the gap between the light extraction unit 2 and the light guide 1 becomes narrow.

At this time, because the two ends of the light extraction unit 2 are supported by the spacer units 10, the distance from the light guide 1 does not change at the two ends of the light extraction unit 2. The portion, i.e., the central portion of the light extraction unit 2, that is not held by the spacer units 10 comes close to the light guide 1 due to the electrostatic force described above. In other words, the light extraction unit 2 undergoes elastic deformation and protrudes toward the light guide 1 side in a protruding configuration; and the central portion comes close to the light guide 1.

The display device according to the embodiment further includes the spacer unit 10 provided between the light extraction unit 2 and the side surface 1s. The spacer unit 10 forms a spacer 100 between a part of the light extraction unit 2 and the side surface 1s. The light extraction unit 2 comes close to the side surface 1s due to elastic deformation of the light extraction unit 2 in response to the application of the voltage.

In the state in which ±150 V was applied respectively to the first conductive unit 3 and the second conductive unit 4 by the drive circuit 5, the light guide 1 substantially contacted the light extraction unit 2. In this state, the light extraction from the light guide 1 was confirmed.

When the application of the voltage to the first conductive unit 3 and the second conductive unit 4 is stopped, the charges are not induced in the light guide 1 because the first conductive unit 3 and the second conductive unit 4 do not have charges; and the static electricity between the light extraction unit 2 and the light guide 1 does not occur. Accordingly, the central portion of the light extraction unit 2 returns to the configuration prior to when the elastic deformation occurred and separates from the light guide 1. Accordingly, the light extraction unit 2 and the light guide 1 are separated each other; and the light inside the light guide 1 is not extracted.

Third Embodiment

Figure 6A:
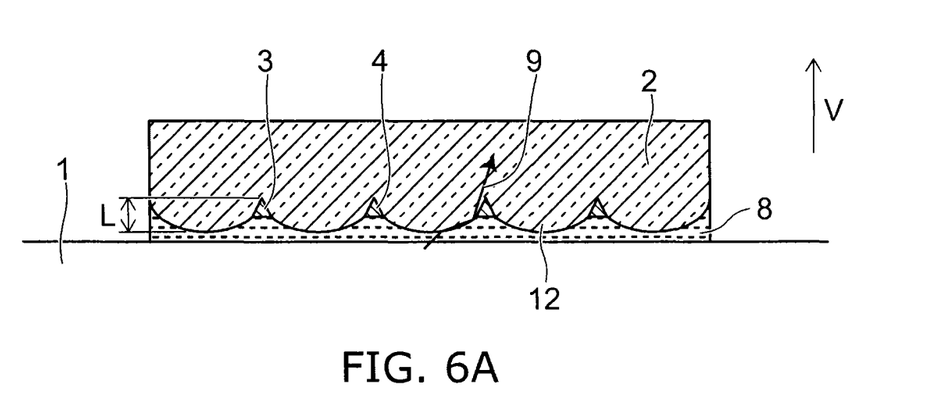
FIG. 6A is a cross-sectional view of a light extraction unit according to a third embodiment.
Figure 6B:
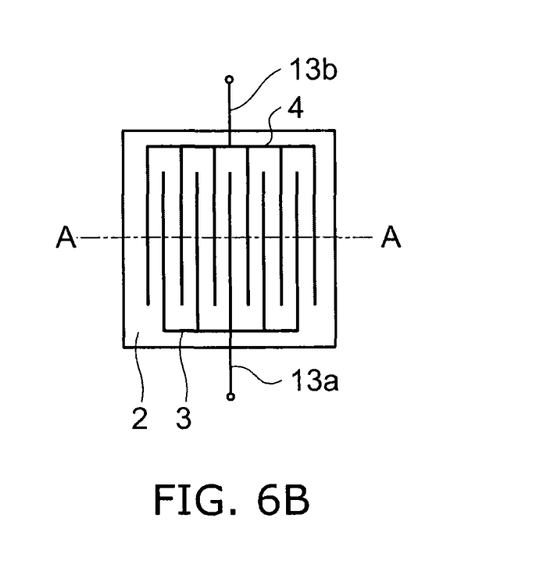
FIG. 6B is a cross-sectional view of a light extraction unit according to a variation of the third embodiment.

FIG. 6 shows the structure of a light extraction unit according to a third embodiment. FIG. 6A is a cross-sectional view; and FIG. 6B is a plan view. FIG. 6A shows the line AA cross section of FIG. 6B. The light extraction unit 2 includes a microlens 12 having a lenticular recessed and protruding configuration. The first conductive unit 3 and the second conductive unit 4 are provided in a comb teeth configuration in the recesses of the microlens 12. In other words, the portion of the interdigit configuration of the first conductive unit 3 and the portion of the interdigit configuration of the second conductive unit 4 are provided along the recesses of the microlens 12. Patterning may be performed after a conductive film is formed using a thin film manufacturing process such as vacuum vapor deposition or sputtering; and an organic conductive film may be selectively coated into the recesses by coating or inkjet printing. In the case of a water-soluble ink, the ink is coated selectively into the recesses. A difference L between the recesses and protrusions of the microlens 12 is micro and is approximately 1 μm. Also, a dimethyl silicone oil was thinly filled as the liquid portion 8 between the light guide 1 and the extraction unit 2.

When voltages (±100 V) having mutually opposite polarities were applied to the first conductive unit 3 and the second conductive unit 4 in this state, protrusions of the microlens 12 contacted the light guide 1; a part of the light (light 9l) traveling through the light guide 1 propagated into the light extraction unit 2 as an evanescent wave; and the light extraction was observed. When the voltage application was stopped, the distance between the light extraction unit 2 and the light guide 1 returned to approximately 1 μm due to the surface tension of the liquid portion 8.

The distance between the first conductive unit 3 and the second conductive unit 4 (inter-electrodes distance) was taken to be 3 μm. Although the electrostatic force that is induced increases as the inter-electrodes distance decreases, a breakdown voltage problem occurs because the electric field strength between the first conductive unit 3 and the second conductive unit 4 increases. Current leaks caused by etching residue or dielectric breakdown occur in the case where the first conductive unit 3 and the second conductive unit 4 (electrodes) are formed by etching. This structure has the advantage that the insulation breakdown voltage is high because the protrusion of the microlens 12 is interposed between the adjacent first conductive unit 3 and the second conductive unit 4 (between electrodes) as another member in this case.

The light entering from the protrusion of the microlens 12 has a light distribution in the upward direction (the V direction) of FIG. 6A due to effects such as total internal reflections at the lens interface, etc. For example, the travel direction of shallow incident light 9 such as that shown in FIG. 6A changes to the upward direction of FIG. 6A due to the effects of the total internal reflections at the side surface of the lens. Accordingly, according to the microlens 12, more of the light extracted by the light extraction unit 2 can be caused to reach the upward direction of FIG. 6A, i.e., the viewing side.

Fourth Embodiment

Figure 7:
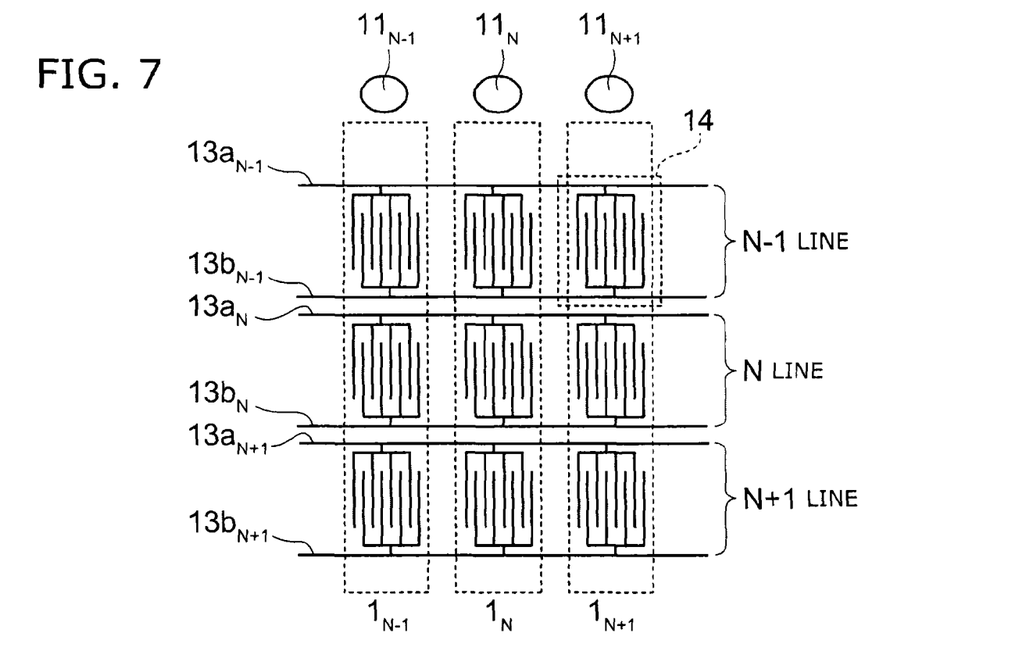
FIG. 7 is an equivalent circuit diagram of a matrix according to a fourth embodiment.

FIG. 7 shows 3 rows by 3 columns of the equivalent circuit of a matrix according to a fourth embodiment.

Among the multiply arranged light guides 1, the light guides $1_{N-1}$, $1_N$ and $1_{N+1}$ of the (N−1)th, Nth, and (N+1)th columns are shown. The first conductive unit 3 (electrode) and the second conductive unit 4 (electrode) having comb teeth configurations are provided to correspond to the light extraction units 2 disposed in the matrix configuration. The first conductive units 3 (electrodes) provided in the same row (the Nth row) are connected to each other by the first scanning line 13aN. Also, the second conductive units 4 (electrodes) provided in the same row (the Nth row) are connected to each other by the second scanning line 13bN.

The pixels are operated by controlling each of the light extraction units 2 inside the matrix by sequentially applying a signal to the scanning lines from the (N−1)th line to the (N+1)th line.

Describing now the specific display operation, for example, voltages of mutually opposite characteristics are applied to the two scanning lines $13a_{N-1}$ and $13b_{N-1}$ of the (N−1)th line (the (N−1)th row); the voltages are applied to the first conductive unit 3 (electrode) and the second conductive unit 4 (electrode) of the light extraction units 2 in the (N−1)th line; and the light extraction operation of becoming proximal to the light guide 1 is performed. In the column direction, the light guides $1_{N-1}$, $1_N$, and $1_{N+1}$ and the light sources $11_{N-1}$, $11_N$, and $11_{N+1}$ corresponding thereto are disposed every one column; and light of any intensity or color is introduced from the light source 11 to the light guide 1 for each of the light sources $11_{N-1}$, $11_N$, and $11_{N+1}$. As a result, the appropriate light is emitted from the pixels (the light extraction units 2) of the (N−1)th line that are in the light-extracting state. For the pixels (the light extraction units 2) of the other rows, the light does not leak out (is not extracted) because the voltages are not applied and the states are not the light-extracting state.

After the light extraction from the pixels of the (N−1)th line is completed, similarly to the (N−1)th line, the light is extracted from the pixels for the Nth line and the (N+1)th line as well by sequentially switching to the light-extracting state by applying the voltages to the scanning lines 13a and 13b and further introducing the light of the appropriate intensity or color from the light source 11 to the light guide 1.

By repeating the operations recited above at a high rate, a moving image can be displayed; and a display operation can be performed at a speed of 60 times per second or a multiple thereof.

Further, the electrical charging of the light guide 1 can be prevented and normal operations can be maintained by the light being extracted from the light extraction units 2 from the first line to the final line (one scanning interval), and by the voltages applied to the scanning lines 13a and 13b having polarities in which positive and negative are reversed from those of the previous scanning interval when again extracting the light from the first line (the next scanning interval).

For example, the drive circuit 5 performs a first operation of applying a second voltage (for example, voltage −V) of a second polarity different from a first polarity to the second conductive unit 4 while applying a first voltage (for example, voltage +V) of the first polarity to the first conductive unit 3 in a first interval. The drive circuit 5 performs a second operation of applying a fourth voltage (for example, voltage +V) of the first polarity to the second conductive unit 4 while applying a third voltage (for example, voltage −V) of the second polarity to the first conductive unit 3 in a second interval after the first interval. The drive circuit 5 repeats alternately the first operation and the second operation.

Fifth Embodiment

Figure 8:
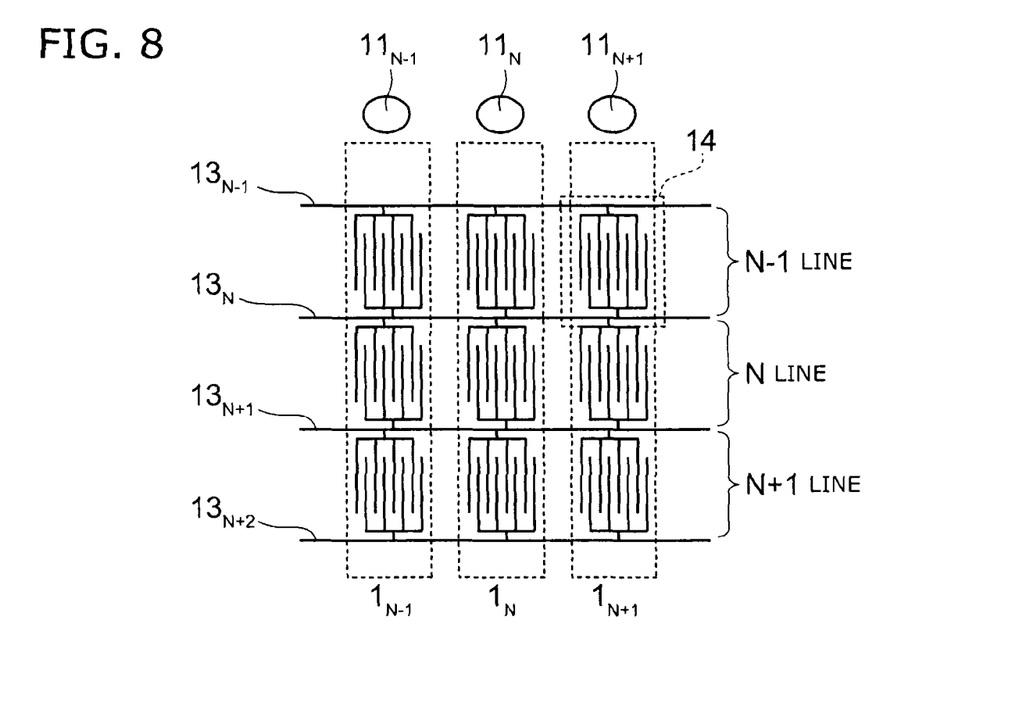
FIG. 8 is an equivalent circuit diagram of a matrix according to a fifth embodiment.

FIG. 8 shows 3 rows by 3 columns of the equivalent circuit of a matrix according to a fifth embodiment. Namely, FIG. 8 shows the first conductive unit 3 and the second conductive unit 4 provided in each of the light extraction units 2 of 3 rows by 3 columns and the scanning lines 13 connected thereto. This differs from the fourth embodiment in that the scanning line $13b_{N-1}$ of the (N−1)th line and $13a_N$ of the Nth line of FIG. 7 together form $13_{N+1}$ of FIG. 8; and similarly, $13b_N$ and $13a_{N+1}$ together form $13_{N+1}$ of FIG. 8. In other words, the first conductive units 3 of the Nth line and the second conductive units 4 of the (N−1)th line are connected by a common scanning line $13_N$. Also, the second conductive units 4 of the Nth line and the first conductive units 3 of the (N+1)th line are connected by a common scanning line $13_{N+1}$.

By using a common scanning line 13 for adjacent lines, the number of outputs of the scanning line drive circuit that supplies the drive voltages to these scanning lines 13 can be halved; and the panel cost can be drastically reduced.

Figure 9:
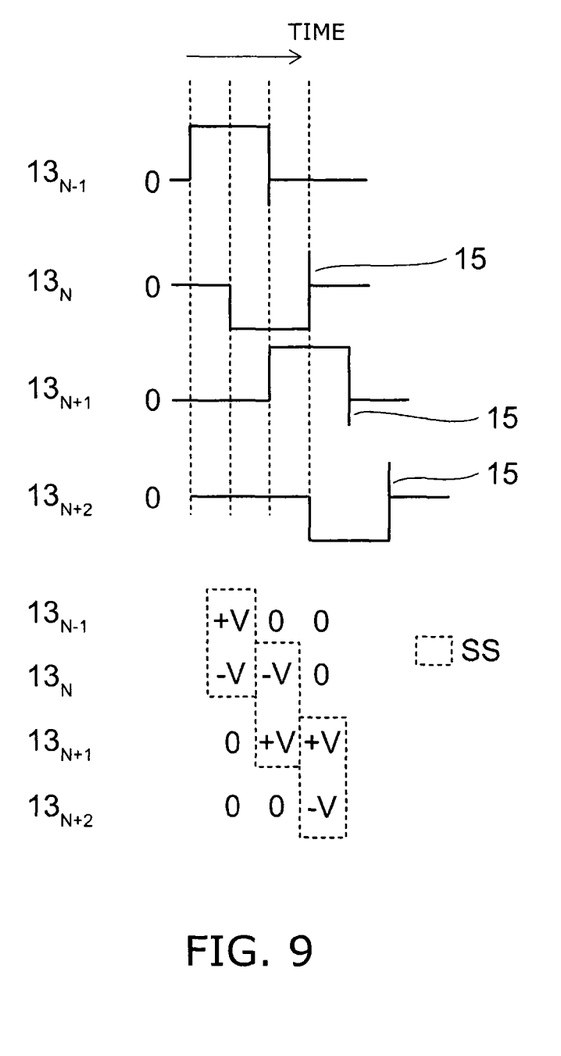
FIG. 9 is a time chart according to the fifth embodiment.

A time chart of the drive voltage supplied to each of the scanning lines 13 according to the fifth embodiment is shown in FIG. 9. First, the voltage +V is applied to the scanning line $13_{N-1}$; and the voltage 0 is applied to the other scanning lines $13_N$, $13_{N+1}$, and $13_{N+2}$. Although the voltage +V is applied to the first conductive units 3 of the light extraction units 2 of the (N−1)th line, the voltage applied to the second conductive units 4 in this state is 0; and therefore, a sufficient voltage is not applied to the pixels of the (N−1)th line, and the state is not the light-extracting state because the light guides 1 are not contacted.

Then, while maintaining the voltage of the scanning line $13_{N-1}$ at +V, the scanning line $13_N$ is changed to −V. As a result, a voltage of 2V is applied to the (N−1)th line pixels; and these are switched to the light-extracting state. In other words, because this is a state in which the voltage +V is applied to the first conductive units 3 of the light extraction units 2 of the (N−1)th line and the voltage −V is applied to the second conductive units 4, the electrostatic force acts between the light guides 1 and the light extraction units 2 of the (N−1)th line; and the light extraction units 2 contact the light guides 1. The voltage of V is applied to the Nth line pixels; and these are not in the light-extracting state.

Then, the applied voltage of the scanning line $13_{N-1}$ is returned to 0; the applied voltage of the scanning line $13_N$ remains at −V; and the applied voltage of the scanning line $13_{N+1}$ is changed to +V. As a result, the pixels $14_{N-1}$ of the (N−1)th line are in the unselected state (the non light-extracting state); the pixels $14_N$ of the Nth line are in the selected state SS (the light-extracting state); the pixels $14_{N+1}$ of the (N+1)th line are in the unselected state (the non light-extracting state); and the selected line (the line that is in the light-extracting state) transitions from the (N−1)th line to the Nth line.

As described above, when returning the voltage of the (N−1)th line to zero, the neutralization of the charge induced in the light guide 1 can be promoted by applying an opposite polarity pulse 15 for a very short period of time; as a result, the light extraction unit 2 can quickly separate from the light guide 1; and the response rate increases.

After the light extraction from the pixels of the (N−1)th line is completed, the Nth line and the (N+1)th line are sequentially switched to the light-extracting state, and the light of the appropriate intensity or color is introduced from the light source 11 to the light guide 1.

By repeating the operations recited above at a high rate, a moving image can be displayed; and the display operation is generally performed at a speed of 60 times per second or a multiple thereof.

Further, by the voltages applied to the scanning lines 13a and 13b in the next scanning interval having polarities in which positive and negative are reversed, the charging of the light guide 1 can be prevented; and normal operations can be maintained.

The invention is not limited to the above embodiments as is, and can be substantiated by varying the components without departing from the spirit in the implement of the embodiments. Various inventions can be formed by suitably combining multiple components disclosed in the above embodiments. For example, some components may be deleted from the whole components shown in the embodiments. Furthermore, the components extending across different embodiments may be suitably combined.

The embodiments of the invention have been described with reference to specific examples. However, the invention is not limited to these specific examples. For instance, shapes, size, material, disposal relation or the like of various specific configurations of the components constituting the light guide, the light extraction unit, the drive circuit, the scanning line, the cladding, the spacer unit or the like can be variously modified by those skilled in the art. Such modifications are also encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

Moreover, all display devices practicable by an appropriate design modification by those skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
a light source that emits a first light;
a light guide having a first end, a second end arranged in a first direction with the first end, and a side surface extending in the first direction, the light guide guiding the first light from the first end toward the second end;
a light extraction unit opposing the side surface, the light extraction unit including a first conductive unit provided parallel to the side surface and a second conductive unit provided parallel to the side surface, the light extraction unit extracting the first light guided inside the light guide by coming close to the side surface for a state in which a voltage is applied to the first conductive unit and the second conductive unit than for a state in which the voltage is not applied; and
a drive circuit,
wherein
the light guide includes a first portion opposing the first conductive unit and a second portion opposing the second conductive unit,
the drive circuit applies a first voltage having a first polarity to the first conductive unit and applies a second voltage having a second polarity to the second conductive unit, the second polarity being opposite to the first polarity, to induce a first charge having the second polarity at the first portion and a second charge having the first polarity at the second portion to cause the light extraction unit to come close to the side surface.

2. The device according to claim 1, further comprising:
a first scanning line; and
a second scanning line, the light guide being multiply provided, the light guides being arranged in a second direction non-parallel to the first direction,
the light extraction unit being multiply provided, the light guides being provided in a matrix configuration in a plane including the first direction and the second direction, and
the first scanning line connecting the first conductive units included in the light extraction units arranged in the second direction to the drive circuit,
the second scanning line connecting the second conductive units included in the light extraction units arranged in the second direction to the drive circuit.

3. The device according to claim 2, wherein
the first scanning line further connects the first conductive units included in the light extraction units arranged in the second direction, and
the second scanning line further connects the second conductive units included in the light extraction units arranged in the second direction.

4. The device according to claim 1, further comprising:
a cladding provided on the side surface of the light guide, and having a refractive index lower than a refractive index of the light guide,
a thickness of a portion of the cladding opposing the light extraction unit is variable.

5. The device according to claim 4, wherein the cladding covers a portion not opposing the light extraction unit of the side surface.

6. The device according to claim 4, wherein the cladding is insulative.

7. The device according to claim 6, wherein the light guide is insulative.

8. The device according to claim 4, wherein a thickness of the portion of the cladding opposing the light extraction unit is not more than 0.3 micrometers in the state in which the voltage is applied to the first conductive unit and the second conductive unit.

9. The device according to claim 4, wherein a thickness of the portion of the cladding opposing the light extraction unit is not more than 0.1 micrometers in the state in which the voltage is applied to the first conductive unit and the second conductive unit.

10. The device according to claim 4, wherein the portion of the cladding opposing the light extraction unit is formed of a liquid having a refractive index not more than a refractive index of a portion of the cladding not opposing the light extraction unit.

11. The device according to claim 10, wherein at least a part of a surface of the light extraction unit contacting the liquid is more hydrophobic than a surface of the light guide contacting the liquid.

12. The device according to claim 10, wherein
the light extraction unit has a first surface contacting the liquid,
the light guide has a second surface contacting the liquid, and
wettability of at least a part of the first surface to the liquid is lower than wettability of the second surface to the liquid.

13. The device according to claim 10, wherein the liquid includes dimethyl silicone oil.

14. The device according to claim 2, wherein the first scanning line and the second scanning line extend in the second direction.

15. The device according to claim 2, wherein
the first scanning line of an Nth row is formed together with the second scanning line of an (N−1)th row, and
the second scanning line of the Nth row is formed together with the first scanning line of an (N+1)th row.

16. The device according to claim 1, wherein
the drive circuit performs
a first operation of applying a second voltage of a second polarity different from a first polarity to the second conductive unit while applying a first voltage of the first polarity to the first conductive unit in a first interval, and
a second operation of applying a fourth voltage of the first polarity to the second conductive unit while applying a third voltage of the second polarity to the first conductive unit in a second interval.

17. The device according to claim 16, wherein the drive circuit alternately repeats performing the first operation and performing the second operation.

18. The device according to claim 1, further comprising:
a spacer unit provided between the light extraction unit and the side surface, the spacer unit forming a space between a part of the light extraction unit and the side surface,
the light extraction unit coming close to the side surface by an elastic deformation of the light extraction unit in response to application of the voltage.

19. The device according to claim 1, further comprising:
a spacer unit provided between the light extraction unit and the side surface, the spacer unit forming a space between a part of the light extraction unit and the side surface,
a distance between the part of the light extraction unit and the side surface being variable in response to application of the voltage.

20. The device according to claim 1, wherein a gap between the light guide and the light extraction unit in a state in which the voltage is not applied is not less than 0.5 micrometers and not more than 10 micrometers.

* * * * *